(12) United States Patent
Nishino

(10) Patent No.: US 6,347,083 B1
(45) Date of Patent: Feb. 12, 2002

(54) TRANSMISSION POWER CONTROL APPARATUS FOR A CDMA SYSTEM

(75) Inventor: Masahiro Nishino, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/027,735

(22) Filed: Feb. 23, 1998

(30) Foreign Application Priority Data

| Feb. 24, 1997 | (JP) | ............................................. 9-038771 |
| Mar. 4, 1997 | (JP) | ............................................. 9-049231 |
| Oct. 3, 1997 | (JP) | ............................................. 9-271163 |

(51) Int. Cl.$^7$ ......................... H04B 7/216; H04B 1/00; H04B 7/00
(52) U.S. Cl. ........................................ 370/342; 455/69
(58) Field of Search ................................ 370/317, 318, 370/319, 320, 321, 326, 328, 335, 336, 337, 342, 343, 344, 345, 347; 455/69, 70, 522

(56) References Cited

U.S. PATENT DOCUMENTS

| 5,305,468 A | * | 4/1994 | Bruckert et al. ............... 455/69 |
| 5,732,328 A | * | 3/1998 | Mitra et al. .................... 455/69 |
| 5,870,393 A | * | 2/1999 | Yano et al. .................. 370/335 |
| 5,873,028 A | * | 2/1999 | Nakano et al. ............... 455/69 |
| 5,982,766 A | * | 11/1999 | Nystrom et al. ............. 370/347 |
| 5,991,285 A | * | 11/1999 | Ghosh ......................... 370/335 |
| 6,085,107 A | * | 7/2000 | Persson et al. ............. 455/522 |
| 6,088,324 A | * | 7/2000 | Sato ............................ 370/203 |
| 6,148,208 A | * | 11/2000 | Love ........................... 455/442 |
| 6,163,707 A | * | 12/2000 | Miller ......................... 455/522 |
| 6,181,738 B1 | * | 1/2001 | Chheda et al. .............. 375/224 |

OTHER PUBLICATIONS

Dohi and Sawahashi, "Power Control by Employing Interface Power of DS/CDMA", Technical Report of IEICE, the Institute of Electronics, Information and Communication Engineers of Japan, RCS 94–99 (1994–10), pp. 63–68.

* cited by examiner

Primary Examiner—Douglas Olms
Assistant Examiner—Kevin C. Harper
(74) Attorney, Agent, or Firm—Wenderoth, Lind & Ponack, L.L.P.

(57) ABSTRACT

A power transmission control apparatus for a CDMA system is disclosed which determines, with each of signals received from a plurality of mobile terminals, a difference between a power ratio to a total interference power to a requested power ratio, and controls the transmission power of the individual terminal on the basis of the above difference. The difference is weighted in accordance with communication quality required of the individual received signal so as to produce an evaluation value. The transmission power requested of the individual mobile terminal is updated such that the evaluation value decreases. Even when the number of calls increases and aggravates the difference of the signal weighted little, the evaluation value associated with such a signal varies little. At the same time, the signal weighted much can maintain the existing communication quality. When the difference of the signal weighted much increases, the evaluation value varies noticeably and allows the transmission power to be varied accordingly. It follows that the transmission power associated with the signal weighted much can be controlled adequately and rapidly.

12 Claims, 12 Drawing Sheets

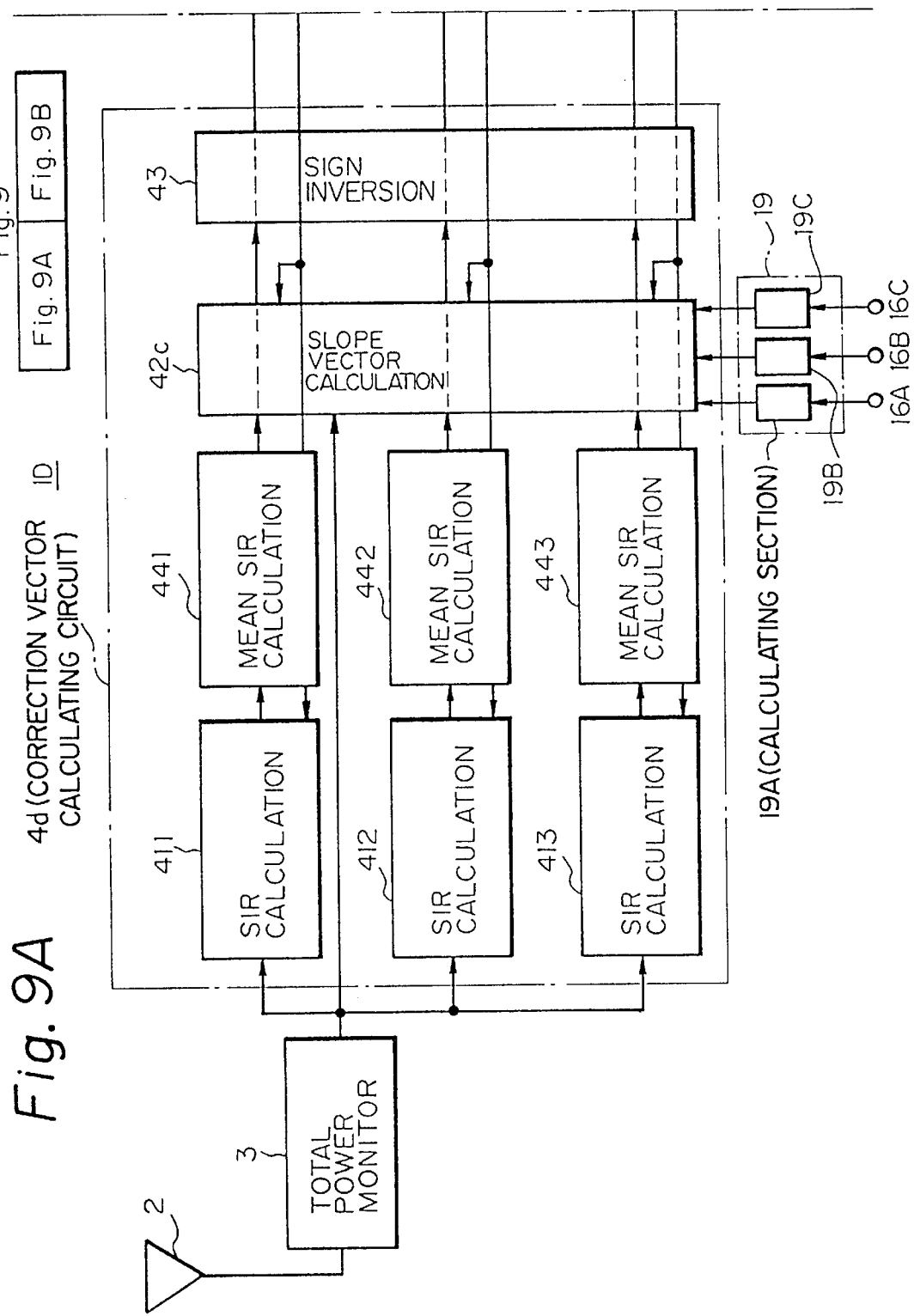

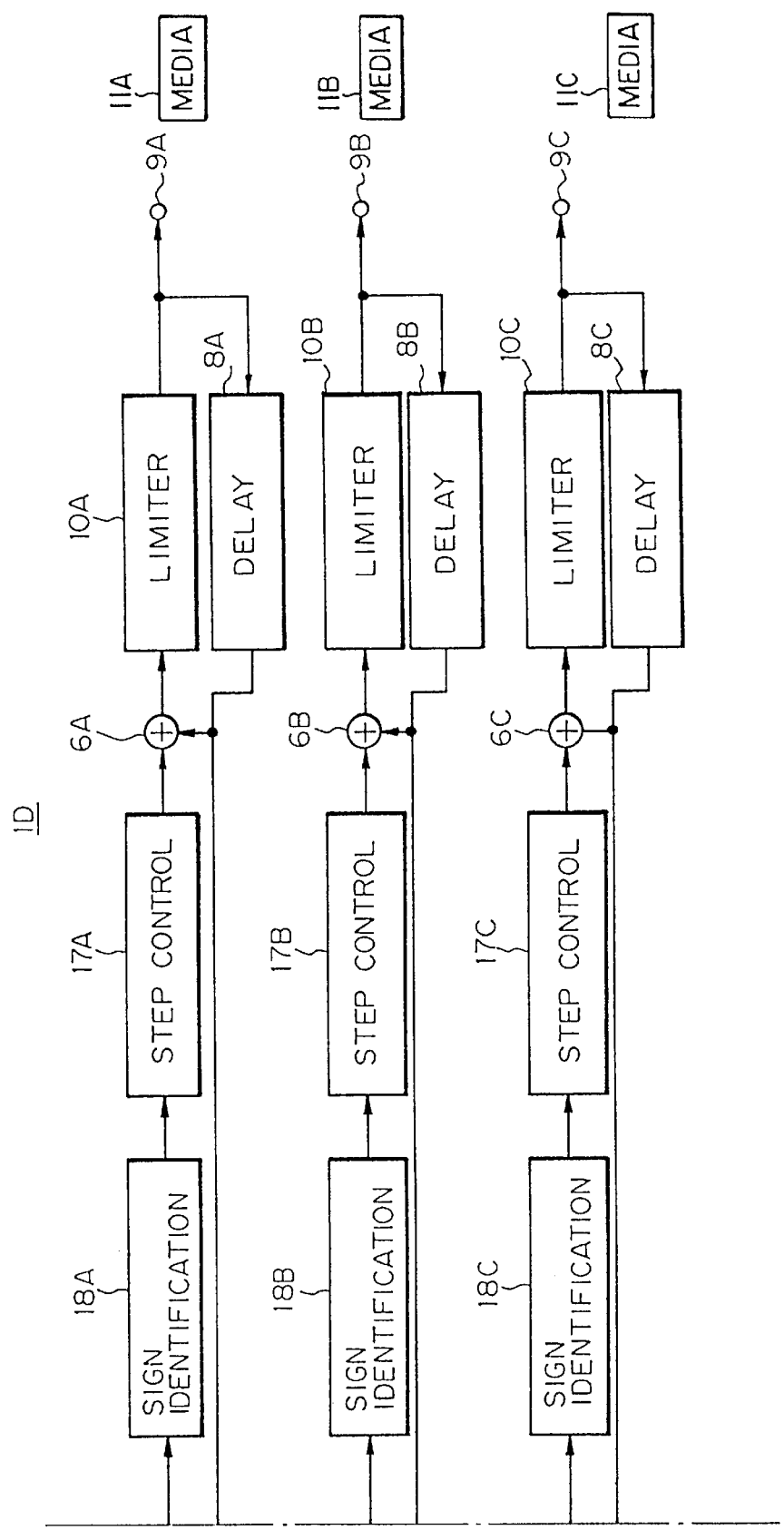

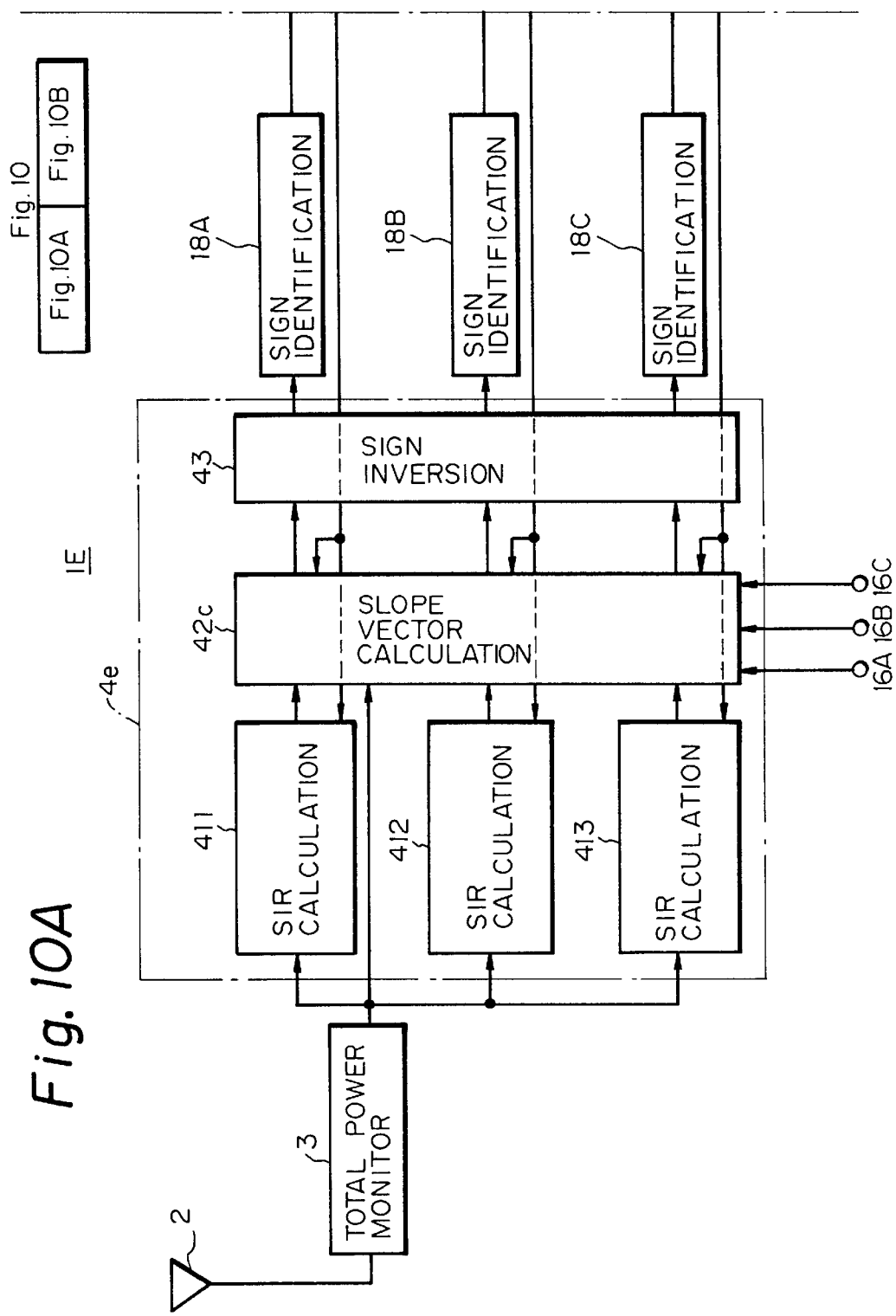

TRANSMISSION POWER CONTROL APPARATUS FOR A CDMA SYSTEM

BACKGROUND OF THE INVENTION

1. Field of the Invention

The present invention relates to a CDMA (Code Division Multiple Access) system using a spread spectrum communication scheme and, more particularly, to an apparatus applicable to a CDMA system for controlling the transmission power of a mobile communication terminal.

2. Description of the Background Art

Currently, CDMA systems are attracting increasing attention as a multiple access system which allows a plurality of users to hold communication at the same time while sharing a radio transmission path. The CDMA system assigns the same frequency to a plurality of users by use of a spread spectrum technology. A study on spread spectrum technology is discussed in, e.g., Dohi and Sawahashi "Power Control by employing Interference Power for DS/CDMA", Technical Report of IEICE, the Institute of Electronics, Information And Communication Engineers of Japan, RCS 94–99 (1994-10), pp. 63–68. Accurate control over transmission power is essential with the CDMA system in increasing the subscriber capacity. A conventional transmission power control procedure is as follows.

First, a base station observes a signal-to-interference power ratio (SIR hereinafter) and compares it with a required SIR selected beforehand. If the observed or actual SIR is greater than the required SIR, meaning that communication quality is high, the base station inserts a command for lowering the transmission power in transmission power control bits included in a frame to be sent to a mobile station. If the actual SIR is smaller than the required SIR, meaning that communication quality is low, the base station inserts a command for raising the transmission power in the above control bits.

It is a common practice with a transmission power control apparatus to insert the transmission power control bits in a data signal, so that the base station can control the transmission power of the individual mobile station. Mobile stations each demodulates the frame received from the base station and raises or lowers its transmission power as instructed by the control bits included in the frame.

However, the problem with the conventional transmission power control apparatus is that it controls the transmission power of the individual mobile station on a call-by-call basis, neglecting the degrees of importance of information media. As a result, when the number of calls is great, the power of interference waves increases and deteriorates even the SIR of information medium needing high quality (usually data communication medium). In this condition, the control apparatus sends a transmission power increase command for calls meant for the information medium needing high quality. This, however, deteriorates the SIR when it comes to calls meant for the information media whose required quality is relatively low. Consequently, the control apparatus commands even the information media not needing high quality to raise their transmission powers. In the worst case, the control apparatus repeats the above procedure and eventually deteriorates the SIRs of all the information media, failing to maintain communication quality.

SUMMARY OF THE INVENTION

It is therefore an object of the present invention to provide a transmission power control apparatus for a CDMA system capable of reducing the deviation of the actual quality from required quality more with an information medium of higher degree of priority than with an information medium of lower degree of priority, In accordance with the present invention, a transmission power control apparatus determines, with each of signals received from a plurality of terminals, a difference between a power ratio to a total power and a requested value, and control a transmission power to be requested of an associated one of the plurality of terminals on the basis of the difference. A request signal power updating circuit weights the difference determined signal by signal in accordance with signal-by-signal required communication quality to thereby calculate an evaluation value representative of the evaluation of the difference, and updates the transmission power to be requested of the terminal associated with the above difference such that the evaluation value decreases.

Also, in accordance with the present invention, a transmission power control apparatus controls the transmission power of each of a plurality of terminals on the basis of the power of a signal received from the individual terminal. A power ratio calculating circuit determines, with each of a plurality of information media available for the plurality of terminals, a sum of powers received from the terminals, and determines a ratio of the sum of powers to a total power received from all of the plurality of terminals. A difference calculating circuit calculates a difference between the ratio determined medium by medium and a request value requested a single control interval before terminal by terminal. A request signal power updating circuit weights the difference in accordance with the degree of importance of the information medium to thereby produce an evaluation amount of the difference for each information medium, and updates a request signal power to be requested of the individual information medium such that the evaluation value decreases.

Further, in accordance with the present invention, a transmission power control apparatus controls the transmission power of each of a plurality of terminals on the basis of the power of a signal received from the individual terminal. A power ratio calculating circuit determines, with each of a plurality of information media, a sum of powers of signals received from the terminals, and determines a ratio of the sum of powers to a total power received from all of the plurality of terminals. A correction amount calculating circuit produces a difference between the ratio determined medium by medium and a request signal power ratio produced from a request signal power calculated a single control interval before medium by medium, weights the difference in accordance with the degree of importance of the information medium to thereby evaluate the difference, and calculates a correction amount medium by medium such that a resulting evaluation value decreases. A sign identifying circuit determines whether or not correction amounts output from the correction amount calculating circuit each is positive or negative. A step control circuit outputs, for each of the results of identification output from the sign identifying circuit, a preselected increment/decrement in accordance with the result. A request signal power calculating circuit adds the preselected increment/decrement to the request signal power calculated a single control interval before medium by medium to thereby output a request signal power to be requested at the current control interval. A control command transmitting circuit transmits, based on the request signal power output from the request signal power calculating circuit, a control signal to a corresponding one of the plurality of terminals.

BRIEF DESCRIPTION OF THE DRAWINGS

The objects and features of the present invention will become more apparent from the consideration of the following detailed description taken in conjunction with the accompanying drawings in which:

FIG. 9 shows how FIGS. 9A and 9B are combined with each other;

FIGS. 9A and 9B, when combined as shown in FIG. 9, are a schematic block diagram showing a fifth embodiment of the present invention;

FIG. 10 shows how FIGS. 10A and 10B are combined with each other; and

FIGS. 10A and 10B, when combined as shown in FIG. 10, are a schematic block diagram showing a sixth embodiment of the present invention.

DESCRIPTION OF THE PREFERRED EMBODIMENTS

Preferred embodiments of the transmission power control apparatus for a CDMA system in accordance with the present invention will be described hereinafter.

First Embodiment

This embodiment is applicable to a mobile communication system capable of providing, e.g., services using a plurality of different kinds of information media each needing a particular degree of quality. Such information media include an audio medium, video medium, data medium, and suitable combinations thereof. To better understand the illustrative embodiment, a specific configuration of the mobile communication system will be briefly described with reference to FIG. 1.

Figure 1:
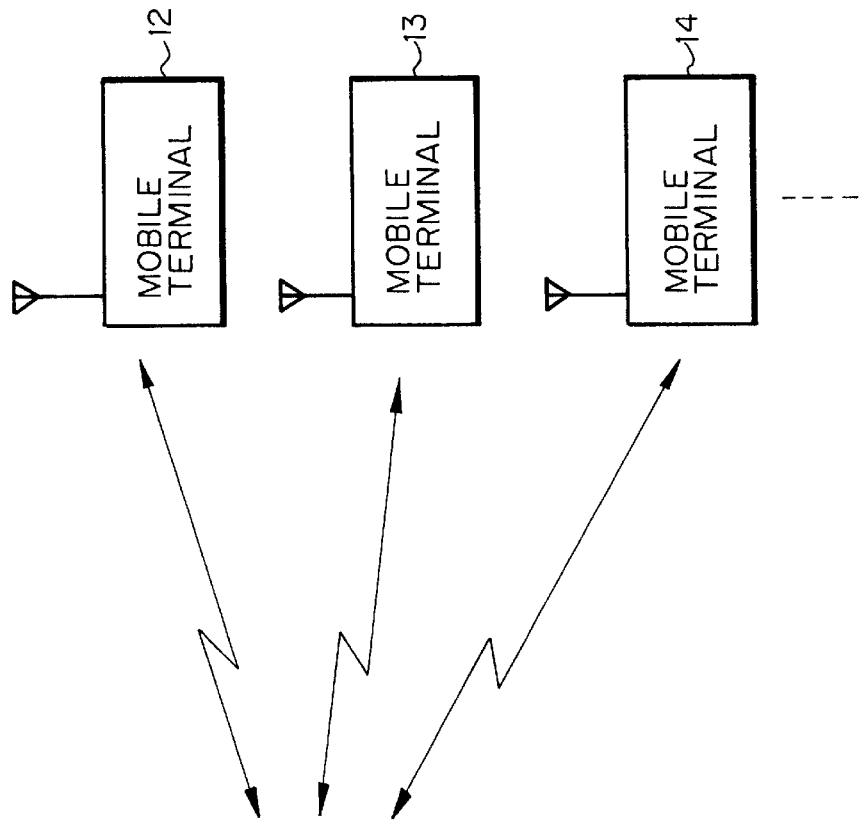
FIG. 1 is a block diagram schematically showing a mobile communication system to which the present invention is applicable.

As shown in FIG. 1, the system is exemplarily assumed to include a single base station 11 and three mobile terminals or stations 12, 13 and 14. Assume that the mobile terminals 12–14 each corresponds to an information medium needing a particular degree of quality. That is, the mobile terminals 12–14 each interchanges a particular information medium with the base station 11. The base station 11 includes a transmission power control apparatus 1 embodying the present invention and capable of controlling the transmission power of the individual mobile station. The transmission power control apparatus 1 monitors the power of a signal wave received from each of the the terminals 12–14, and controls the transmission power of the individual mobile station such that it approaches a request signal power S (Signal) requested by a single control interval before, as will be described specifically later.

Figure 2:
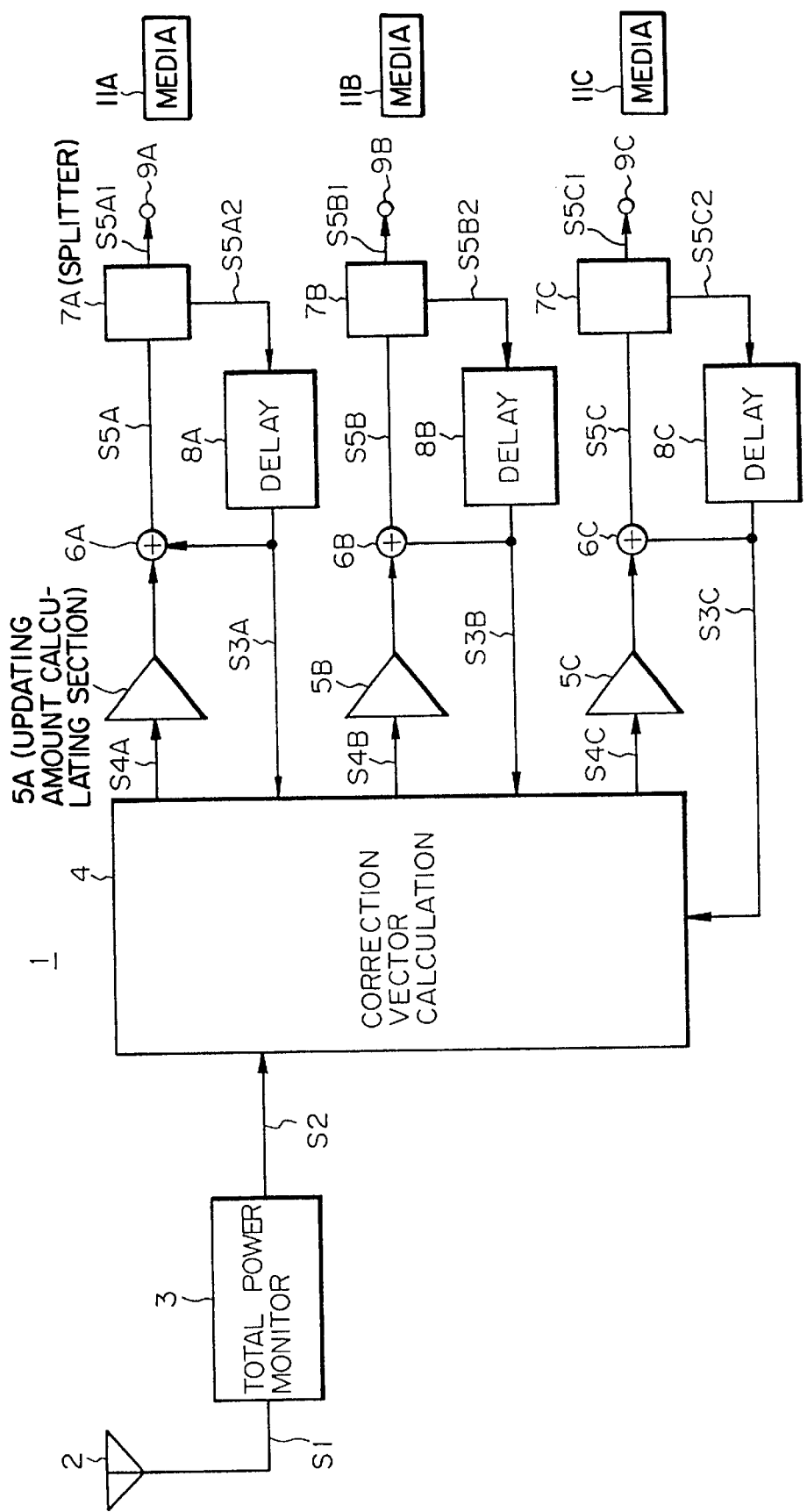
FIG. 2 is a block diagram schematically showing a first embodiment of the transmission power control apparatus in accordance with the present invention.

As shown in FIG. 2, the transmission power control apparatus 1 includes an antenna 2, a total power monitor 3, and correction vector calculation 4, updating amount calculating sections 5A–5C, adders 6A–6C, splitters 7A–7C, delays 8A–8C, and output terminals 9A, 9B, and 9C assigned to media 11A–11C, respectively. The antenna 2 receives radio waves sent from the mobile terminals 12–14 belonging to the base station 11. The antenna 2 may be implemented by a diversity antenna by way of example. A signal S1 coming in through the antenna 2 is applied to the total power monitor 3.

The total power monitor 3 measures the total power of the input received signal S1 and feeds a total signal power S2 to the correction vector calculation 4. It is to be noted that the received signal S1 includes not only signal waves meant for the base station 11, but also interference waves and other noise components.

The correction vector calculation 4 receives, in addition to the total signal power S2, request signal powers S3A, S3B and S3C which the base station 11 requested for the information media 11A–11C at the time of the last control. In response, the calculation 4 calculates correction vectors S4A, S4B and S4C to be used at the time of the next control. Specifically, the calculation 4 calculates each of the correction vectors S4A–S4C such that the weighted absolute sum of a difference between the observed SIR and the required SIR decreases. In the illustrative embodiment, an evaluation amount is defined by the weighted square sum of the difference between the observed SIR and the required SIR. The sign of the slope vector of the evaluation amount is inverted so as to produce the correction vectors S4A, S4B or S4C.

For the above calculation, the correction vector calculation 4 weights the information medium of higher degree of priority more than the information medium of lower degree of priority. This allows the difference between the received power and the required power to be reflected more by the correction vector as the degree of priority given to the information medium increases. Stated another way, although the above difference may increase with lower communication quality for the information medium of a lower degree of priority, it has hardly any influence on the correction vector. With this principle, the calculation 4 maintains the communication quality of the information medium of a higher degree priority close to its required reception quality.

The updating amount calculating sections 5A–5C each is assigned to a particular one of the information media 11A–11C. These calculating sections 5A–5C each multiplies an associated one of the calculated correction vectors S4A–S4C by a preselected constant optimal for the system. The constant allows the correction vectors S4A–S4C to be reflected by the request signal powers S3A–S3B respectively.

The updating amount calculating sections 5A–5C are connected to the adders 6A–6C, respectively. The adders 6A–6C respectively add the request signal powers S3A–S3C to the correction vectors S4A–S4C multiplied by the above constant. The resulting outputs of the adders 6A–6C are request signal powers S5A, S5B and S5C to be output at the time of the next control. The request signal powers S5A–S5C are fed to the splitters 7A–7C, respectively.

The splitters 7A–7C respectively split the request signal powers S5A–S5C fed from the adders 6A–6C, respectively outputting two signals S5A1 and S5A2, S5B1 and S5B2, and S5C2. The signals S5A1, S5B1 and S5C1 are respectively applied to output terminals 9A–9C while the signals S5A2, S5B2 and S5C2 are respectively applied to the delays 8A–8C. The delays 8A–8C respectively delay the split request signal powers S5A2, S5B2 and S5C2 by a period of time corresponding to a single control interval. The resulting outputs of the delays 8A–8C are the request signal powers S5A–S5C which the base station 11 requested of the mobile terminals 12–14 one control interval before.

The input terminals 9A–9C assigned to the information medial 11A–11C, respectively, are electrically connected to a transmission antenna, not shown. The request signal powers S5A1–S5C1 to be requested at the time of the next control are sent from the output terminals 9A–9C to the terminals 12–14, FIG. 1, via the transmission antenna.

In operation, radio waves received from the mobile terminals 12–14 via the receipt antenna 2 are applied to the total power monitor 3 as a received signal S1. The total power monitor 3 measures the total interference power (I) of the received waves, i.e., the total power of signals meant for the base station 11, interference waves, and noise. The total signal power is input to the correction vector calculation 4. The correction vector calculation 4 determines a ratio of each request signal power (S) which the base station 11 requested of the associated information medium one control interval before to the total signal power (I), i.e., an SIR approximately. In addition, the calculation 4 counts the mobile terminals connected to the information media medium by medium.

On determining the medium-by-medium SIRs, numbers of terminals connected, request signal powers, and total interference power, the correction vector calculation 4 calculates the correction vectors S4A–S4C by using a steepest descent method, as will be described hereinafter.

The steepest descent method minimizes an evaluation amount $f(x)$, i.e., determines x which minimizes $f(x)$. Specifically, among various methods using an equation $x^{(k+1)}=x^{(k)}+\alpha p^{(k)}$ and sequentially replacing k with 0, 1, 2 and so on, the steepest descent method inverts the sign of the slope vector of the evaluation value $f(x)$. A sequence of steps (a)–(d) implementing the steepest descent method are as follows.

(a) First, a suitable parameter x is given an initial value $x^{(0)}$, and a parameter k representative of the number of times of repetition is selected to be zero (k=0).

(b) The slope vector of an evaluation amount $f(x^{(k)})$ is calculated, and then the sign of the vector is inverted to produce $p^{(k)}$.

(c) A parameter $x^{(k+1)}$ is updated by $x^{(k)}+\alpha p^{(k)}$.

(d) Subsequently, k is replaced with k+1, and the procedure returns to the step (b).

Assume that the evaluation value $f(\cdot)$ is the weighted sum of the squares of differences between the medium-by-medium requested SIRs and the corresponding actual SIRs. Then, the evaluation value $f(\cdot)$ is expressed as:

$$f(p_1, p_2 \ldots p_N) = \sum_{i=1}^{N} W_i \left( 10\log_{10} \frac{p_i'}{\sum_{j=i}^{M} M_j p_j' + g} - Q_i \right)^2 \quad \text{Eq. (1)}$$

where $p_i$ denotes the request signal power which the base station 11 requests the i-th information medium and is assumed to be $p_i$ 10 $\log_{10} p_i'$ in terms of dB, $M_j$ denotes the number of terminals connected to the j-th information medium, $Q_i$ denotes quality necessary for the i-th information medium, g denotes interference signals from the adjoining cells and other noise powers, and $W_i$ denotes a weighting coefficient corresponding to the degree of priority assigned to the i-th information medium. It is to be noted that a portion of the above Eq. (1) indicative of the observed SIR is as follows:

$$\log \frac{10^{\frac{p_i}{10}}}{\sum_{j=1}^{N} M_j 10^{\frac{p_i}{10}} + g} \quad \text{Eq. (2)}$$

As for the steepest descent method, it is necessary to determine the slope vector of the evaluation amount. Determining the slope vector of the Eq. (1) gives:

$$\frac{\delta f(p_i, \ldots, p_N)}{\delta p_k} = 10^{\frac{p_k}{10}} \sum_{\substack{i=1 \\ i \neq k}}^{N} 2W_i \frac{10}{\log 10} \log \left( \frac{10^{\frac{p_i}{10}}}{\sum_{j=1}^{N} M_j 10^{\frac{p_i}{10}} + g} - \right.$$
$$\left. Q_i \frac{\log 10}{10} \times \frac{M_k}{\sum_{j=1}^{N} M_j 10^{\frac{p_i}{10}} + g} \right) +$$
$$10^{\frac{p_k}{10}} 2W_k \frac{10}{\log 10} \left( \log \frac{10^{\frac{p_k}{10}}}{\sum_{j=1}^{N} M_j 10^{\frac{p_i}{10}} + g} - \right.$$
$$\left. Q_k \frac{\log 10}{10} \right) \times \left( \frac{1}{10^{\frac{p_k}{10}}} - \frac{M_k}{\sum_{j=1}^{N} M_j 10^{\frac{p_i}{10}} + g} \right) \quad \text{Eq. (3)}$$

By inverting the sign of the above result, there is produced a correction vector. Assuming an information medium k, parameters are an $SIR_k$ observed with the medium k, the number of terminals $M_k$ connected to the medium k, the request signal power $p_k$, and total power pa. When those parameters are input to the Eq. (3), the Eq. (3) is rewritten as:

$$\frac{\delta f(SIR_k, M_k, p_k, pa)}{\delta p_k} = 10^{\frac{p_k}{10}} \sum_{\substack{i=1 \\ i \neq k}}^{N} 2W_i(SIR_i - Q_k) \times \left( -\frac{M_k}{pa} \right) + \quad \text{Eq. (4)}$$
$$10^{\frac{p_k}{10}} 2W_k(SIR_k - Q_k) \times \left( \frac{1}{10^{\frac{p_k}{10}}} - \frac{M_k}{pa} \right)$$

The total power pa output from the total interference power monitor 3, the request signal power $p_k$ output from a delay circuit $8_k$ (any one of the delays 8A–8C), the $SIR_k$ particular to the information medium k and calculated by the correction vector calculation 4, and the number of terminals $M_k$ are used to calculate the slope vector of the medium k in accordance with the Eq. (4) Then, the sign of the slope vector is inverted so as to produce a correction vector.

The correction vector is input to an associated one of the updating amount calculating sections 5A–5C. The calculating sections 5A–5C each selects a suitable constant α allowing a correction vector to be reflected by transmission power beforehand. The calculating section having received the correction vector multiplies it by the preselected constant α and outputs the resulting product as an amount by which the transmission power of the associated information medium should be updated. For example, assume that the base station 11 assigns a request signal power $p_i(n)$ to the i-th information medium at a time n, and that the amount of updating is Δ. Then, a request signal power at a time (n+1) is produced by:

$$p_i(n+1)=p_i(n)+\alpha\Delta \qquad \text{Eq. (5).}$$

The outputs of the updating amount calculating section 5A–5C are input to the adders 6A–6C, respectively. The adders 6A–6C each adds the output of the associated updating amount calculating section and the request signal power which the base station 11 requested one control interval before, thereby producing a request signal power to be requested at the time of the next control. The outputs of the adders 6A–6C are applied to the splitters 7A–7C, respectively.

The splitters 7A–7C each splits the request signal power input thereto into two, as stated earlier. The split signals S5A1–S5C1 are respectively fed to the output terminals 9A–9C to be output as request signal powers for the information media. The other split signals S5A2–S5C2 are respectively delivered to the delays 8A–8C used to calculate the next request signal powers. The delays 8A–8C each holds one of the signals S5A2–S5C2 input thereto for one control interval and then feeds it to associated one of the adders 6A–6C.

The output terminals 9A–9C each outputs the request signal power input thereto. The base station 11 additionally includes a power control command transmitting section, not shown, to which the request signal powers are fed from the output terminals 9A–9C. This section compares the individual request signal power and associated actual signal power and commands, based on the result of comparison, the individual mobile terminal connected to a particular information medium to change its transmission power.

As stated above, the illustrative embodiment sets evaluation amounts weighted in accordance with the priority order of information media, and controls a request signal power meant for the individual medium such that the evaluation amount decreases. Therefore, even when the number of calls increases, the embodiment provides the information medium of higher degree of priority with its required communication quality.

In the above embodiment, the evaluation amount is defined by the weighted square sum of a difference between the observed SIR of the individual information medium and the request SIR. Alternatively, the evaluation amount may be defined by, e.g., the weighted sum of an absolute difference. Also, the steepest descent method for the calculation of a correction vector may be replaced with any other suitable algorithm, e.g., an LMS (Least Mean-Square) algorithm or an RLS (Recursive Least Squares) algorithm.

In the illustrative embodiment, the weight is increased with an increase in the degree of importance or decreased with a decrease in the degree of importance. If desired, the weight and the degree of importance may be provided with a nonlinear relationship, or even a single weight may be assigned to a plurality of different degrees of importance.

Further, in the embodiment, a particular priority order is given to each information medium, and the weight is varied in accordance with the order of priority. Alternatively, the priority order as to the required quality may be set channel by channel. While the transmission power control apparatus has been shown and described as being situated at the base station of a mobile communication system, the embodiment is similarly applicable to systems other than a mobile communication system.

Second Embodiment

Figure 3:
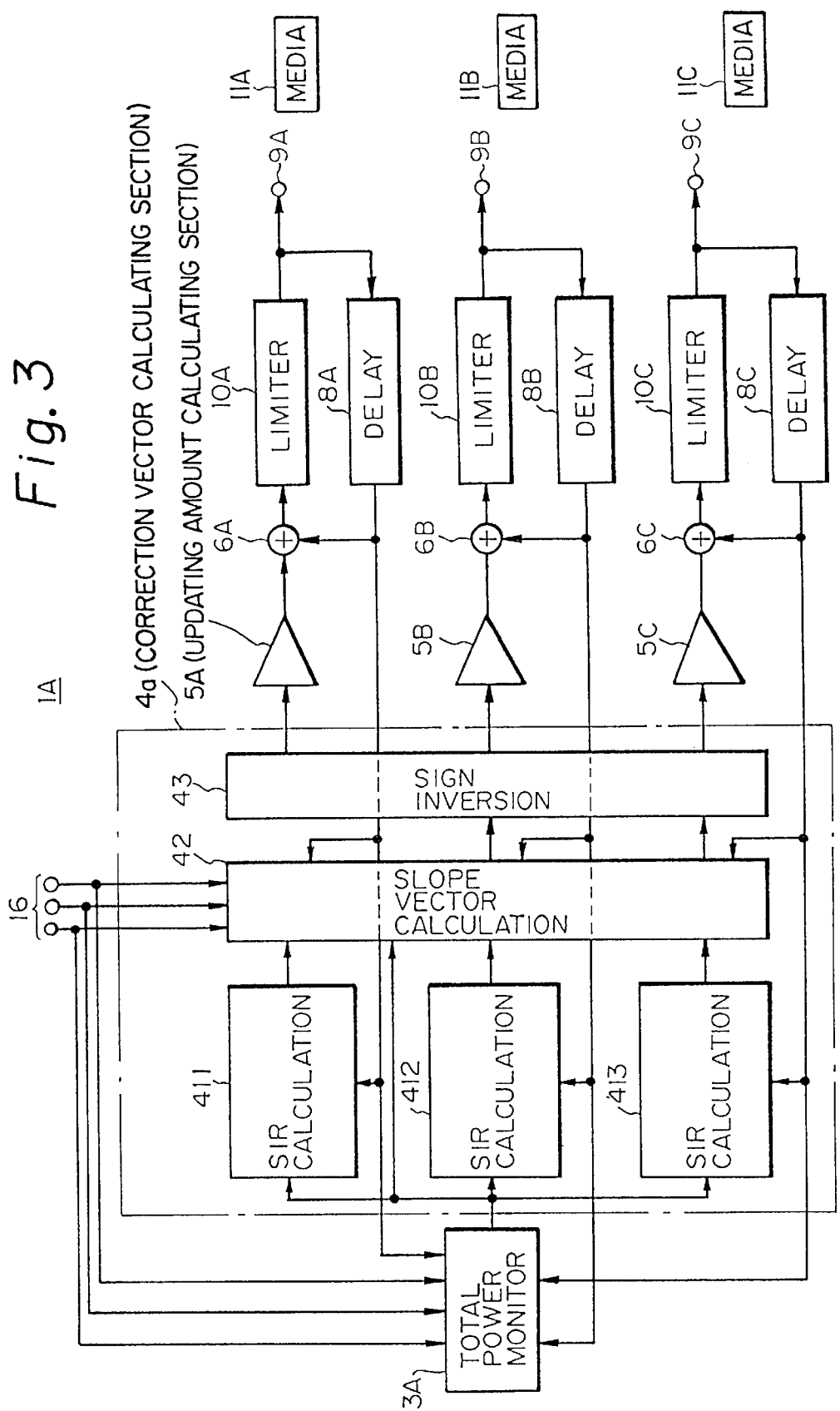
FIG. 3 is a block diagram schematically showing a second embodiment of the present invention.

Referring to FIG. 3, a second embodiment of the transmission power control apparatus in accordance with the present invention will be described. It is to be noted that this embodiment is constructed on the assumption of a single cell. As shown, a transmission power control apparatus, generally 1A, includes a total power calculation 3A, a correction vector calculating circuit 4a, the updating amount calculating sections 5A–5C, the adders 6A–6C, limiters 10A–10C, delays 8A–8C, and output terminals 9A–9C.

The total power calculation 3A calculates the sum of the powers of signal waves received from the mobile terminals 12–14, i.e., the total interference power. The total interference power is calculated on the basis of the number of information media, the numbers of terminals M0–M2 respectively connected to the three information media, and request signal powers p0–p2 each requested of the individual information medium one control interval before. Because the number of information media is assumed to be three, the calculation 3A produces the total interference power pa by sequentially inputting the numbers of terminals M0–M2 and the request signal powers p0–p2. The number of terminals varying every moment is input via output terminals 16 belonging to a channel control unit, not shown. The request signal powers having occurred one control interval before are output from the delay circuits 8A–8C, as in the previous embodiment.

Figure 4:
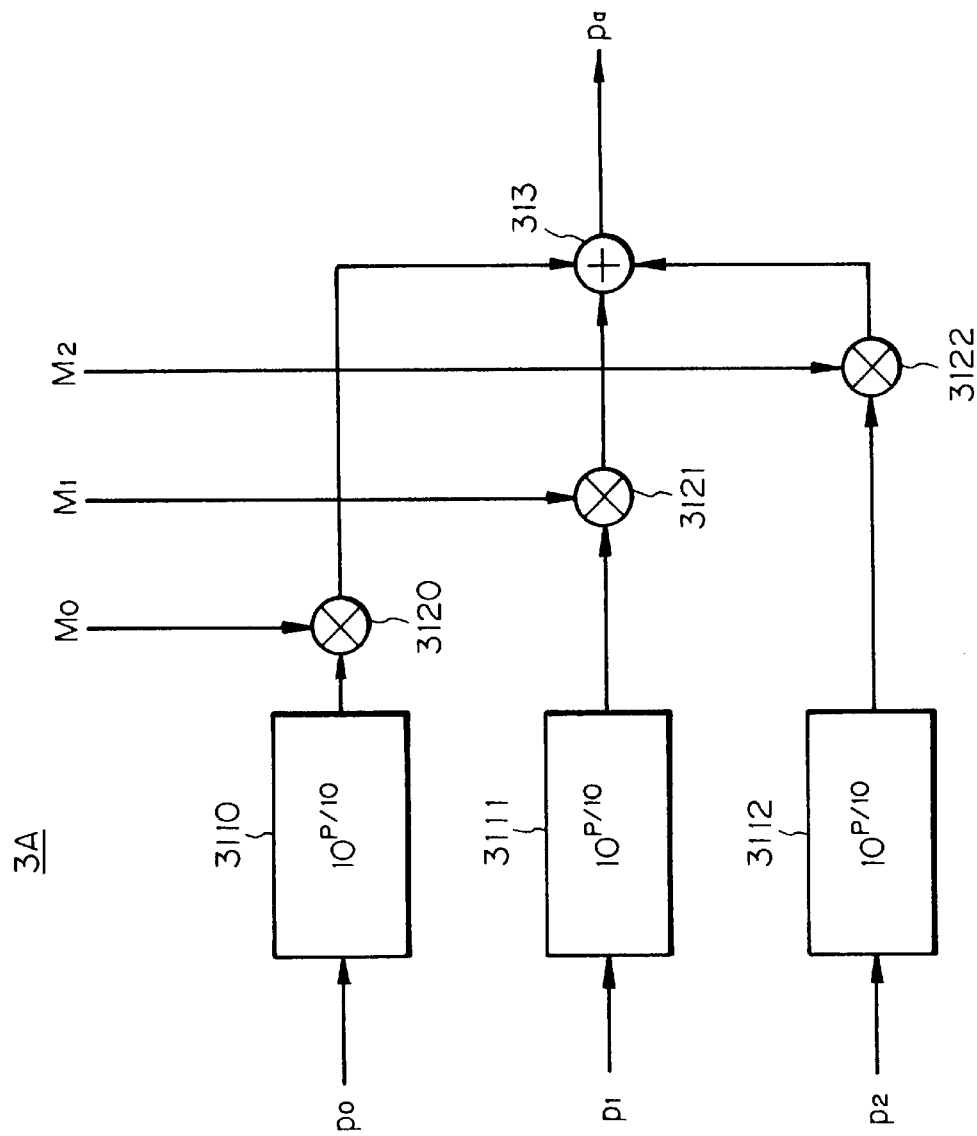
FIG. 4 is a schematic block diagram showing a specific configuration of a total power calculating section included in the second embodiment.

FIG. 4 shows a specific configuration of the total power calculation 3A. As shown, the calculation 3A is made up of calculating sections 311k (k=0, 1, 2), multipliers 312k (k=0, 1, 2), and an adder 313. The calculating sections 311k each is assigned to 4a particular information medium and calculates a signal power received from the associated mobile terminal. The multipliers 312k are respectively connected to the calculating sections 311k, and each multiplies the output of the associated calculating section 311k by the number of terminals Mk connected to the corresponding information medium. The adder 313 adds the resulting products output from the multipliers 312k.

The total interference power calculated by the total power calculation 3A is input to the correction vector calculating section 4a. The correction vector calculating section 4a evaluates, in terms of an evaluation function, the differences between the current signal powers derived from the total power and the request signal powers requested one control interval before. Then, the calculating section 4a determines correction vectors reducing the above differences by the steepest descent method. For this purpose, the calculating section 4a has three SIR calculations 411, 412 and 413 respectively assigned to the three information media, a slope vector calculation 42, and a sign inversion 43.

The SIR calculations 41k (k=1, 2, 3) each receives the current total power of the associated information medium from the total power calculation 3A, and receives the request signal power requested one control interval before from the delay 8A, 8B or 8C connected to the SIR calculation 41k. Each SIR calculation 41k determines a ratio of the request signal power S of the associated information medium to the total interference power I. Then, the SIR calculation 41k converts the determined ratio to a value in dB so as to produce an SIR.

The slope vector calculation 42 evaluates a difference between each SIR to be requested and the actual SIR in terms of an evaluation amount (f(·) which will be described), and indicates the direction and size of the evaluated difference in the form of a slope vector. The slope vector refers to the evaluation amount partially differentiated by the request signal power of the associated information medium.

Specifically, evaluation amounts are determined by the medium-by-medium new SIRs output from the SIR calculations 411–413, the request signal powers calculated one control interval before, and the numbers of terminals connected to the information media. As for the evaluation amount, the information media of higher degree of priority is weighted more than the information media of lower degree of priority. This allows the difference between the received power and the request power to be reflected more by the correction vector as the degree of priority given to the information medium increases. Stated another way, although the above difference may increase with lower communication quality for the information medium of lower degree of priority, it has hardly any influence on the corrector vector.

The sign inversion 43 inverts the signs of the slope vectors output from the slope vector calculation 42. Inverting the sign means making the inclination of the correction vector inverse to the difference or deviation and thereby reducing the evaluation amount.

Figure 5:
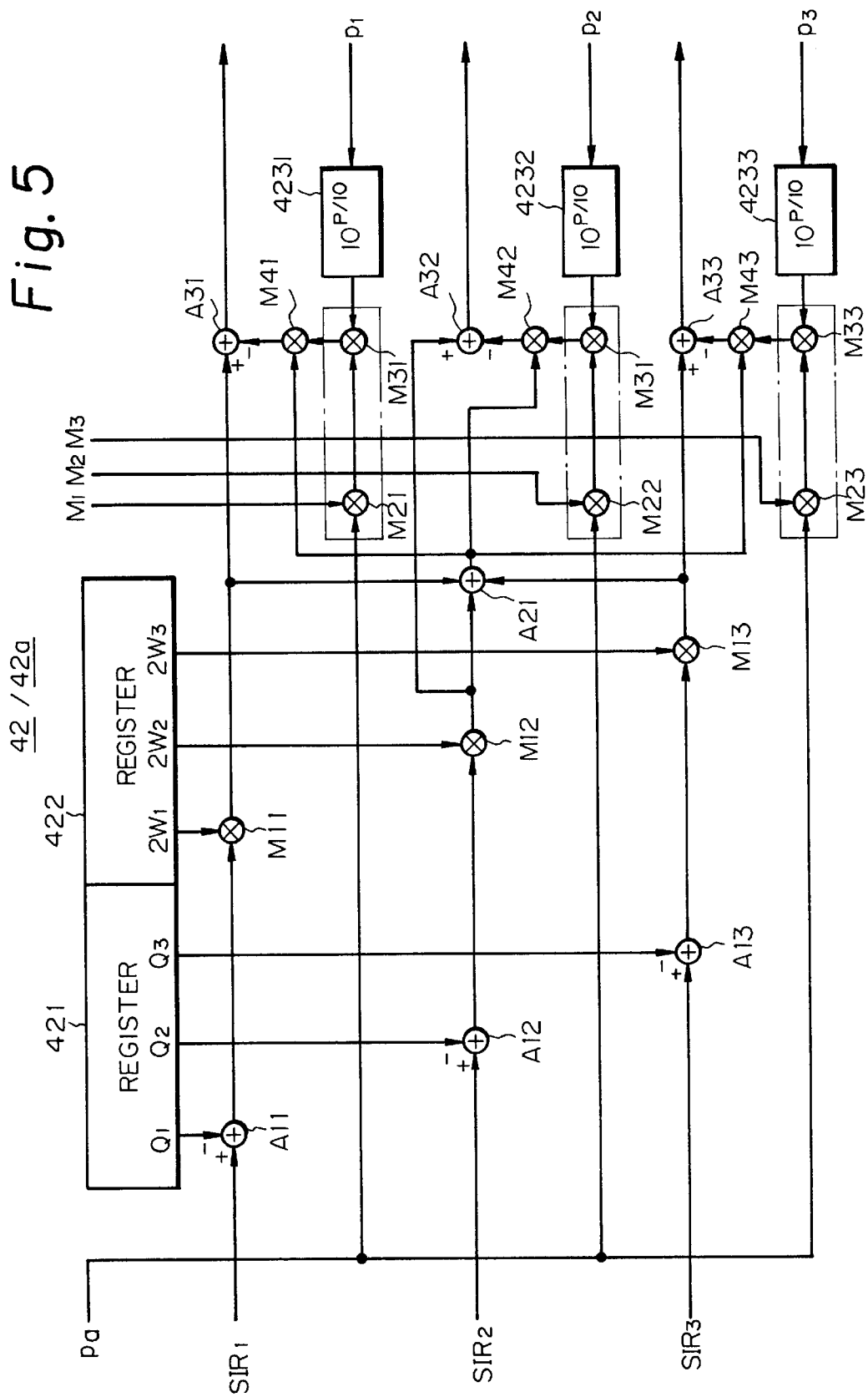
FIG. 5 is a schematic block diagram showing a specific configuration of a slope vector calculating section also included in the second embodiment.

A specific configuration of the slope vector calculation 42 is shown in FIG. 5. Assume that qualities $Q_k$ (k=1, 2, 3; dB) requested of the three different information media and weighting coefficients $W_k$ (k=1, 2, 3) corresponding to the degrees of priority of the information media are respectively stored in registers 421 and 422 beforehand. Adders A1k (k=1, 2, 3) respectively calculate differences between the required qualities $Q_k$ and the SIRs $SIR_k$ (quality errors hereinafter) of the associated information media k. Multipliers M1k (k=1, 2, 3) each multiplies the quality error output from the associated adder A1k by the weighting coefficient $W_k$ particular to the associated information medium. An adder A21 produces the sum of the medium-by-medium weighted quality errors.

Unit converting sections 423k (k=1, 2, 3) each converts the unit of the value $p_k$ of the request signal power requested of the associated information medium k one control interval before from the value in the unit of dB to the actual power value. Specifically, the unit converting sections 423k each produces $10^{(pk)/10}$. Multipliers M2k and M3k (k=1, 2, 3) cooperate to produce $M_k \cdot 10^{(pk)/10}/pa$ by using the outputs of the unit converting sections 423k, the total power pa output from the total power calculation 3A, and the numbers of terminals $M_k$ connected to the three information media k.

Multipliers M4k (k=1, 2, 3) each multiplies the output of the associated multiplier M3k and the output of the adder A2. Products output from the multipliers M4k influence request signal powers at the time of the next control. Specifically, each multiplier M4k produces $10^{(pk)/10} \cdot \Sigma 2 W_j (SIR_k - Q_k) \cdot M_k/pa$. Adders A3k (k=1, 2, 3) each produces a difference between the weighted quality error of the associated information medium and the output of the associated multiplier M4k and feeds the difference to the sign conversion 43.

The updating amount calculating sections 5A–5C each multiplies the associated correction vector by a preselected constant, so that the correction vector is reflected by the request signal power.

The adders 6A–6C respectively add the request signal powers requested last time to the outputs of the updating amount calculating sections 5A–5C. Sums output from the adders 6A–6C are the candidates of signal powers to be requested at the time of the next control.

The limiters 10A–10C each determines whether or not the candidate of the request signal power output from associated one of the adders 6A–6C lies in a preselected dynamic range. If the candidate exceeds the dynamic range, the limiter limits it to the upper limit of the dynamic range.

The delays 8A–8C respectively receive the request signal powers to be fed from the limiters 10A–10C to the output terminals 9A–9C and delay them by one control interval. The outputs of the delays 8A–8C are fed to the total power calculation 3A, SIR calculations 411–413, slope vector calculation 42, and adders 6A–6C, as stated earlier. The output terminals 9A–9C are connected to the power control command transmitting section, not shown.

The operation of the transmission power control apparatus 1A is as follows. First, how the total power calculation 3A calculates a total interference power will be described. The calculation 3A receives the numbers of calls Mk connected to the the information media via the output terminals 16 of the channel control unit. The calculation 3A calculates a total interference power pa on the basis of the numbers of calls Mk and the request signal powers pk requested one control interval before and output from the delays 8A–8C. Because the illustrative embodiment assumes a single cell, the following equation is used for the above calculation:

$$pa = \sum_{j=1}^{N} M_j 10^{pj/10} \quad \text{Eq. (6)}$$

where pa denote the total interference power, N denotes the number of information media, $M_j$ denotes the number of terminals connected to the individual medium, and $P_j$ denotes the request signal power (dB) which the base station requests a media j, where j is a natural number.

The total interference power is fed from the total power calculation 3A to the correction vector calculating circuit 4a. The calculating circuit 4a determines correction vectors by use of the steepest descent method and Eq. (1). In the following equations, interference signals and other noise power g ascribable to the other cells is zero because the embodiment assumes a single cell. A portion of the Eq. (1) represented by Eq. (7) shown below is an SIR:

$$10 \log_{10} \frac{p'_i}{\sum_{j=1}^{N} M_j p'_j + g} \quad \text{Eq. (7)}$$

With the steepest descent method, it is necessary to determine the slope vector of the individual evaluation amount. The slope vector is produced by:

$$\frac{\delta f(p_i, \ldots, p_N)}{\delta pk} = 10^{\frac{pk}{10}} \sum_{\substack{i=1 \\ i \neq k}}^{N} 2W_i \frac{10}{\log 10} \left( \log \frac{10^{\frac{pi}{10}}}{\sum_{j=1}^{N} M_j 10^{\frac{pj}{10}} + g} - \right.$$

$$Q_k \frac{\log 10}{10} \times \left( -\frac{Mk}{\sum_{j=1}^{N} M_j 10^{\frac{pj}{10}} + g} \right) +$$

$$10^{\frac{pk}{10}} 2Wk \frac{10}{\log 10} \left( \log \frac{10^{\frac{pk}{10}}}{\sum_{j=1}^{N} M_j 10^{\frac{pj}{10j}} + g} - \right.$$

$$\left. Q_k \frac{\log 10}{10} \right) \times \left( \frac{1}{10^{\frac{pk}{10}}} - \frac{Mk}{\sum_{j=1}^{N} M_j 10^{\frac{pj}{10}} + g} \right)$$

Eq. (8)

By inverting the sign of the above slope vector, there is produced a correction vector. Parameters available with the individual information medium k are the observed $SIR_k$, the number of terminals $M_k$, the request signal power $P_k$, and total power pa. Therefore, when those parameters are input to the Eq. (8), the Eq. (8) is rewritten as:

$$\frac{\partial f(SIRk, Mk, pk, pa)}{\partial pk} = 10^{\frac{pk}{10}} \sum_{\substack{i=1 \\ i \neq k}}^{N} 2W_i(SIR_i - Q_i) \times$$

$$10^{\frac{pk}{10}} 2Wk(SIRk - Qk) \times \left( \frac{1}{10^{\frac{pk}{10}}} - \frac{Mk}{pa} \right)$$

Eq. (9)

The Eq. (9) is simplified as:

$$\frac{\partial f(SIRk, Mk, pk, pa)}{\partial pk} = 2Wk(SIRk - Qk)10^{\frac{pk}{10}}$$

$$\sum_{i=1}^{N} 2W_i(SIR_i - Q_i) \times \left( \frac{Mk}{pa} \right)$$

Eq. (10)

The value given by the Eq. (10) is the slope vector output from the slope vector calculation 42.

Because the correction vector is opposite in sign to the slope vector, the sign inversion 43 inverts the sign of the slope vector given by the Eq. (10) and thereby outputs the correction vector.

Correction vectors calculated by the correction vector calculating circuit 4a are fed to the updating amount calculating sections 5A–5C, respectively. An optimal constant α for causing transmission powers to reflect the correction vectors is assigned to the calculating sections 5A–5C beforehand. The calculating sections 5A–5C each multiplies the associated correction vector by the constant α to thereby output a transmission power updating amount meant for the associated information medium.

The transmission power is updated media by media, as follows. The updating amounts output from the updating amount calculating sections 5A–5C are input to the adders 6A–6C, respectively. The adders 6A–6C respectively add the input updating amounts to the request signal powers requested by the base station 11 one control interval before and input from the delays 8A–8C. The resulting sums are the candidates of request signal powers which the base station 11 will request at the time of the next control.

The sums output from the adders 6A–6C are respectively fed to the limiters 10A–10C because they must lie in the preselected dynamic range. Whether or not the candidates of the request signal powers to be requested next exceed the dynamic range is determined. If any one of the candidates exceeds the dynamic range, it is replaced with the upper limit of the dynamic range.

The outputs of the limiters 10A–10C are respectively fed to the output terminals 9A–9C as request signal powers to be requested of the information media at the time of the next control. The request signal powers are fed to the power control command transmitting section, not shown, via the output terminals 9A–9C. The power control command transmitting section compares the individual request signal power with the corresponding actual interference power, and sends a command to the individual mobile terminal for causing it to change its transmission power.

The request signal powers output from the limiters 10A–10C are respectively fed to the delay circuits 8A–8C also and delayed by one control interval thereby for the calculation of the next request signal powers.

As stated above, the above embodiment sets evaluation amounts weighted in accordance with the priority order of information media, and controls the request signal powers such that the evaluation amounts become as small as possible. Therefore, even when the number of calls increases, the quality of information medium of higher degree of priority is maintained. Moreover, in a system based on a single cell, as in the above embodiment, the total interference power pa of waves actually received from mobile terminals can be determined by calculation as distinguished from direct measurement.

Third Embodiment

A third embodiment will also be described on the assumption that the system includes three different kinds of information media each needing a particular degree of quality. The base station 11 controls the request signal powers requested of mobile stations each being connected to a particular information medium. Assume that the cell to which the base station 11 belongs is effected by the adjoining cells.

Figure 6:
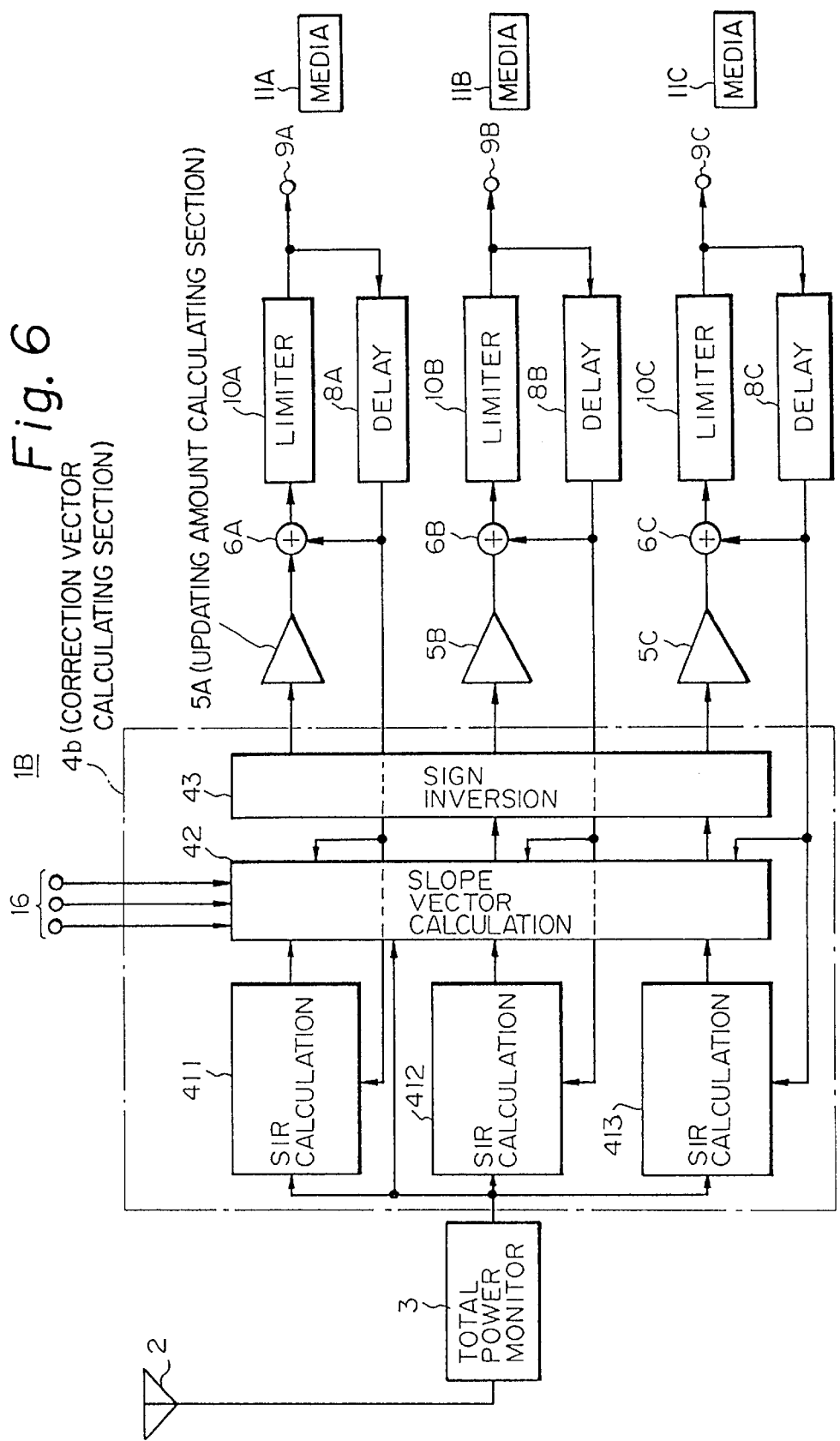
FIG. 6 is a block diagram schematically showing a third embodiment of the present invention.

Referring to FIG. 6, a transmission power control apparatus 1B is shown which is similar to the apparatus 1A shown in FIG. 3. In FIG. 6, like structural elements as the elements shown in FIG. 3 are designated by the same reference numerals, and a detailed description thereof will not be made in order to avoid redundancy. The apparatus 1B differs from the apparatus 1A mainly in that a total power monitor 3 is substituted for the total power calculation 3A, i.e., the apparatus 1B determines a total interference power pa not by calculation, but by actual measurement- of received waves.

Specifically, a signal r(t) coming in through the antenna is applied to the total power monitor 3 for measuring the total interference power pa. Again, the total interference power pa is the total power of signals meant for the base station 11, interference waves, and noise. While the second embodiment neglects the influence of adjoining cells and does not have to observe the total interference power pa, the third embodiment is adapted to measure it. The measured total interference power pa is input to a correction vector calculating circuit 4b.

The circuitry following the correction vector calculating circuit 4b is identical with the circuitry of the second embodiment. The circuitry sequentially executes the calculation of correction vectors based on the observed total interference power pa, the calculation of updating amounts based on the correction vectors, and the calculation of candidates of the next request signal powers. The difference is that in this embodiment the noise power g included in the Eqs. (1), (7) and (8) has a value other than zero, i.e., $g \neq 0$.

The calculated updating amounts each is added to the corresponding request signal power requested one control interval before. The resulting sums are input to the limiters 10A–10C as the candidates of request signal powers to be requested at the time of the next control. When any one of the candidate powers exceeds the preselected dynamic range, it is confined in the dynamic range by an associated one of the limiters 10A–10C. The outputs of the limiters 10A–10C are applied to the output terminals 9A–9C, respectively.

As stated above, the third embodiment, like the second embodiment, sets evaluation amounts weighted in accordance with the priority order of information media, and controls the request signal powers such that the evaluation amounts become as small as possible. Therefore, even when the number of calls increases, the quality of information media of higher degree of priority is maintained. Moreover, because the third embodiment takes account of interference signals and other noise ascribable to the adjoining cells, it is applicable even to a system consisting of a plurality of cells.

Fourth Embodiment

Figure 7:
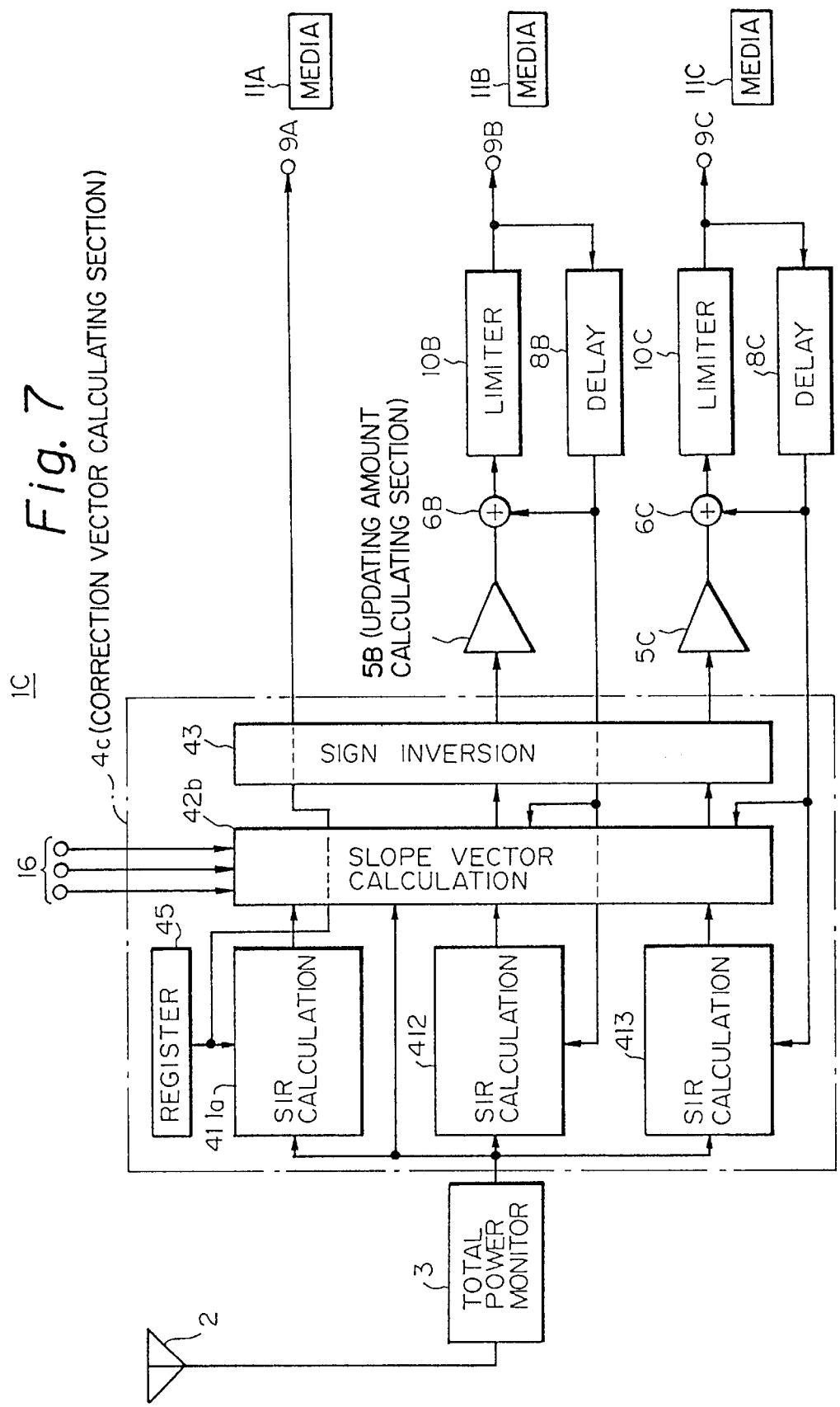
FIG. 7 is a block diagram schematically showing a fourth embodiment of the present invention.

Referring to FIG. 7, a transmission power control apparatus 1C representative of a fourth embodiment of the present invention will be described. Again, assume a system including three different kinds of information media each needing a particular degree of quality. The base station 11 controls the request signal powers requested of mobile terminals each belonging to a particular information medium. Also, assume that the cell to which the base station 11 belongs is effected by the adjoining cells. The fourth embodiment is similar to the third embodiment except that a correction vector calculating circuit 4c includes a register 45 storing a fixed request signal power requested of one of the three information media, and that the updating amount calculating section 5A, adder 6A, limiter 10A and delay 8A assigned to the above one information medium are absent. In FIG. 7, like structural elements as the elements shown in FIG. 6 are designated by the same reference numerals, and a detailed description thereof will not be made in order to avoid redundancy.

Specifically, the transmission power control apparatus 1C is assumed to fix the request signal power meant for the first information medium 11A and to variably control only the request signal powers meant for the other two information media 11B and 11C. Because what is important with the request signal powers meant for the three information media is their relative values, fixing the request signal power of one medium while variably controlling the request signal powers of the other two media is comparable in effect with variably controlling all of the three request signal powers.

The correction vector calculating circuit 4c includes an SIR calculation 411a. While the register 45 feeds the fixed request signal power assigned to the first information media 11A to the SIR calculation 411a, the calculation 4A1a directly determines an SIR based of the fixed request signal power and delivers the SIR to a slope vector calculation 42b.

Figure 8:
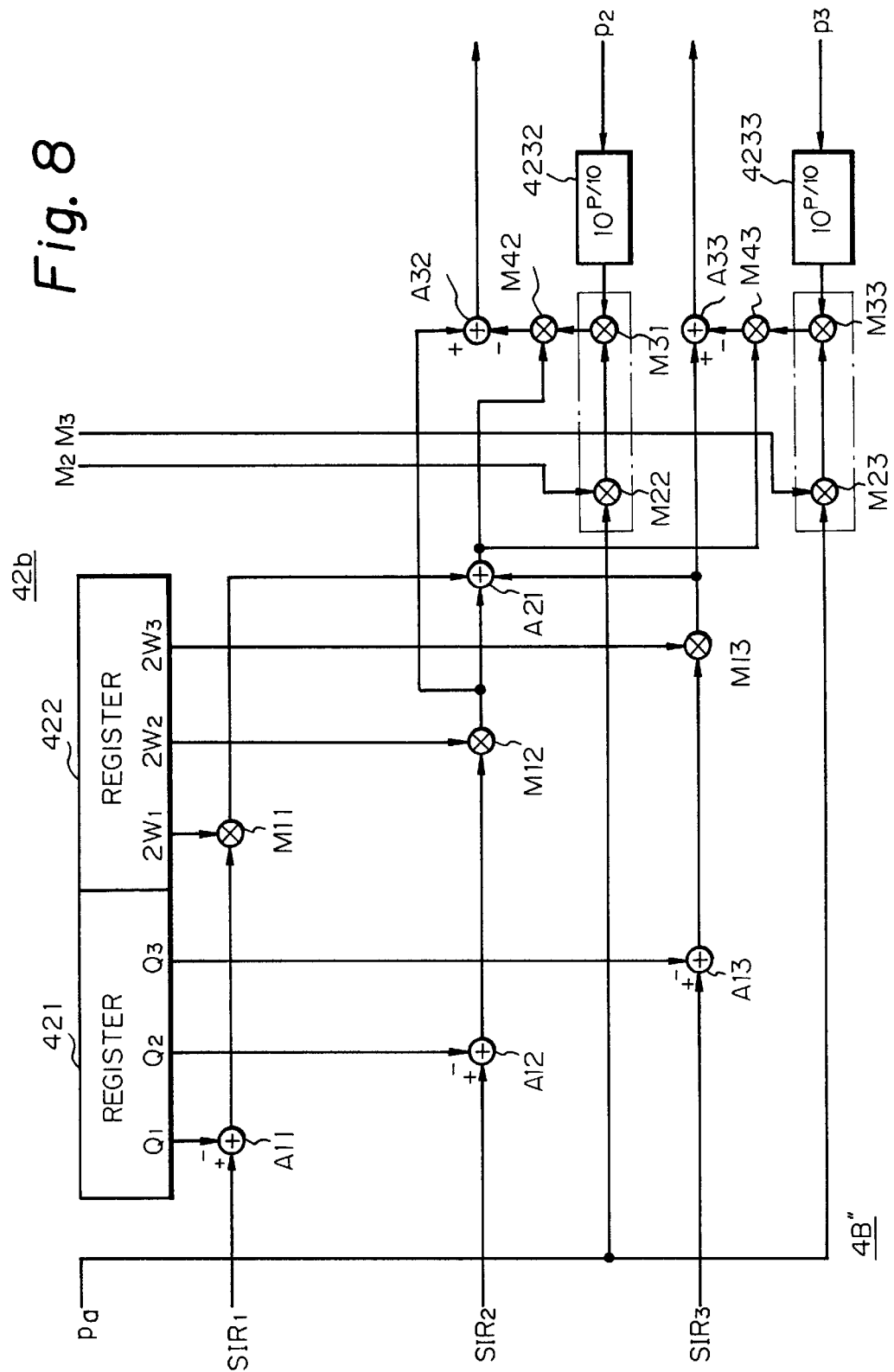
FIG. 8 is a schematic block diagram showing a specific configuration of a slope vector calculating section included in the fourth embodiment.

In the illustrative embodiment, the slope vector calculation 42b does not include the circuitry for calculating the slope vector of the first information medium 11A. FIG. 8 shows a specific configuration of the slope vector calculation 42b. In FIG. 8, like structural elements as the elements shown in FIG. 5 relating to the second and third embodiments are designated by the same reference numerals. As shown, the calculation 42b does not include the multiplier, adder and so forth for determining the slope vector particular to the first information media 11A. This is because it is not the result of calculation but the fixed request signal power stored in the register 45 that is directly output to the output terminal 9A. The second and third information media 11B and 11C are dealt with in the same manner as in the second and third embodiments.

The operation of the transmission power control apparatus 1C will be described hereinafter, concentrating on a procedure unique to the apparatus 1C. First, radio waves sent from the mobile terminals 12, 13 and 14 each belonging to the respective information medium are received by the antenna 2 and applied to the total power monitor 3 as a received signal r(t). The total power monitor 3 measures the total interference power pa of the received signal r(t) and feeds it to the SIR calculations 411a, 412 and 413 of the correction vector calculating circuit 4c. The total interference power pa refers to the total power of the signals meant for the base station 11, interference waves, and noise, as stated earlier.

The correction vector calculating circuit 4c determines the SIRs of the three information media with the SIR calculations 411a, 412 and 413, respectively. It is noteworthy that the SIR calculation 411a calculates an SIR based on the fixed request signal power input from the register 45. The other SIR calculations 412 and 413 operate in exactly the same manner as in the second and third embodiments.

The slope vector calculation 42b calculates media-by-media slope vectors other than one for the first information medium 11A because the request signal power for the medium 11A is fixed, as stated above. It follows that only slope vectors for the information media 11B and 11C are calculated by use of the Eq. (10) and the total weighted quality error output from the adder A21.

The sign inversion 4C inverts the signs of the slope vectors of the information media 11B and 11C so as to produce correction vectors. The correction amount calculating sections 5B and 5C each multiplies the respective correction vector by a suitable value so as to produce an updating amount. The updating amounts output from the calculating sections 5B and 5C are fed to the adders 6B and 6C, respectively. As a result, the adders 6B and 6C respectively output request signal powers to be requested of the information media 11B and 11C at the time of the next control. The limiters 10B and 10C respectively confine the outputs of the adders 6B and 6C in the preselected dynamic range for the reason described previously. The outputs of the limiters 10B and 10C are applied to the output terminals 9B and 9C, respectively.

As stated above, the fourth embodiment sets evaluation amounts weighted in accordance with the priority order of information media while taking account of the interference signals and other noise input from the adjoining cells, and controls the request signal powers such that the evaluation amounts become as small as possible. Therefore, even when the number of calls increases, the quality of information media of higher degree of priority is maintained. In addition, because the control parameter (request signal power) for one of the three information media (media 11A in the embodiment) is fixed, the configuration of the correction vector calculating circuit 4c is simplified.

Fifth Embodiment

FIGS. 9A and 9B show a fifth embodiment of the present invention. As shown, a transmission power control apparatus 1D includes the total power monitor 3, a correction vector calculating circuit 4d, a mean channel number calculating circuit 19, sign identifications 18A, 18B and 18C, step controls 17A–17C, the adders 6A–6C, the limiters 10A–10C, and the delays 8A–8C.

The total power monitor 3 measures the total interference power (I) of received signals coming in through the receipt antenna 2, as in the previous embodiments. The correction vector calculating circuit 4d evaluates, in terms of an evaluation function, a difference between the current received power observed by the total power monitor 3 and the individual request signal power requested one control interval before, and determines a correction vector minimizing the difference by the steepest descent method.

Specifically, the correction vector calculating circuit 4d has the SIR calculations 411, 412 and 413 respectively assigned to the three different information media (i.e. mobile stations 12–14), mean SIR calculations 441, 442 and 443 also respectively assigned to the three media, a slope vector calculation 42c, and the sign inversion 43. The SIR calculations 411–413 each calculates a ratio of the request signal power S requested of the associated information medium one control interval before to the total interference power measured by the total power monitor 3, i.e., an SIR.

The mean SIR calculations 441–443 each produces a mean value of SIRs sequentially output from associated one of the SIR calculations 411–413 over a preselected period of time. This calculation must be completed within a period of time sufficiently shorter than one control interval.

The slope vector calculation 42c evaluates a difference between each SIR to be requested and the actual SIR in terms of an evaluation amount (f(·)), and indicates the direction and size of the evaluated difference in the form of a slope vector. The slope vector refers to the evaluation amount partially differentiated by the request signal power of the associated information medium.

Specifically, evaluation amounts are determined by the total interference power I measured by the total power monitor 3, medium-by-medium SIRs output from the mean SIR calculations 44i (i=1, 2, 3), request signal powers calculated one control interval before, and medium-by-medium mean numbers of channels output from the mean channel number calculating circuit 19.

As for the evaluation amount, the information media of higher degree of priority is weighted more than the information media of lower degree of priority. This allows the difference between the received power and the requested power to be reflected more by the correction vector with an increase in the degree of priority given to the information media. Stated another way, although the above difference may increase and lower communication quality for the information media of lower degree of priority, it has hardly any influence on the corrector vector.

The sign inversion 43 inverts the signs of the slope vectors output from the slope vector calculation 42c. Inverting the sign means making the inclination of the correction vector inverse to the difference or deviation and thereby reducing the evaluation amount.

The mean channel number calculating circuit 19 is made up of three calculating sections 19A, 19B and 19C each being assigned to a particular information medium. The channel control unit, not shown, has output terminals 16A, 16B and 16C connected to the calculating sections 19A–19C, respectively. The calculating sections 19A–19C each produces a mean value of the numbers of terminals connected to the associated information medium over a preselected period of time and feeds it to the slope vector calculation 42c. This calculation should also be completed in a period of time sufficiently shorter than one control interval.

The sign identifications 18A–18C are provided together with the following step controls 17A–17C in order to simplify the control, compared to the previous embodiments simply implemented by the steepest descent method. The sign identifications 18A–18C each determines whether the sign of the correction vector of the associated information medium is positive or negative. The step controls 17A–17C each outputs a preselected power increment/decrement Δ on the basis of the output of associated one of the sign identifications 18A–18C.

The adders 6A–6C respectively add the power increments/decrements Δ output from the step controls 17A–17C to the request signal powers requested one control interval before. The resulting sums output from the adders 6A–6C are the candidates of request signal powers to be requested at the time of the next control.

The limiters 10A–10C each determines whether or not the candidate of the request signal power output from associated one of the adders 6A–6C lies in the preselected dynamic range, and confines it in the dynamic range, as in the previous embodiments. The delays 8A–8C respectively receive the request signal powers to be fed from the limiters 10A–10C to the output terminals 9A–9C, and delays them by one control interval. The delayed request signal powers are delivered to the SIR calculations 411–413, slope vector calculation 42c, and adders 6A–6C, as stated earlier.

The output terminals 9A–9C are connected to the power control command transmitting section, not shown. The request signal powers are therefore sent to the associated mobile terminals via the transmitting section and transmission antenna, not shown.

In operation, the total power monitor 3 measures the total interference power I of the received signal (t) coming in through the receipt antenna 2, and feeds it to the correction vector calculating circuit 4d. In the calculating circuit 4d, the SIR calculations 411–413 each determines a ratio SIR of the associated signal power S requested one control interval before to the total interference power I. The SIRs output from the SIR calculations 411–413 are fed to the mean SIR calculations 411–413, respectively.

The mean SIR calculations 441–443 each produces a mean SIR value over the preselected period of time and delivers it to the slope vector calculation 42c. Also delivered to the slope vector calculation 42c are the media-by-media mean numbers of terminals output from the mean channel number calculating circuit 19. The slope vector calculation 42c determines, by use of the Eq. (1), media-by-media correction vectors on the basis of the mean SIR values, mean numbers of terminals, request signal powers S, and total interference power I. In the cases of the steepest descent method, the slope vectors of evaluation amounts must be determined and are determined by the Eq. (8), as stated earlier.

More specifically, the slope vector calculation 42c receives the total interference power pa' from the total power monitor 3, request signal powers $p_k'$ from the delays 8k (k=A, B, C), mean SIRs $SIR_{k'}$ of the information media k from the mean SIR calculations 4Dk, and mean numbers of channels $M_{k'}$ from the mean channel number calculating circuit 19. The calculation 42c calculates, based on such inputs, media-by-media slope vectors. The sign inversion 4c inverts the signs of the slope vectors so as to output correction vectors.

The sign identifications 18A–18C each determines whether or not the sign of the slope vector input thereto is positive or negative. Each step control 17k (k=A, B, C) assigned to the information media k receives the output of the associated sign identification 18k (k=1, 2, 3) and determines a power increment/decrement Δ in accordance with the sign. On receiving the output of the associated step control circuit 17k, each adder 6k (k=A, B, C) adds the request signal power $p_i(n)$ requested one control interval before and the output of the step control circuit 17k. The resulting sum $p_i^{(n+1)} = p_i^{(n)} + \Delta$ is the candidate of the request signal power $p_i^{(n+1)}$ to be requested next.

The limiter 10k (k=A, B, C) confines the output of the associated adder 6k, i.e., the request signal power in the preselected dynamic range. The output of the limiter 10k is sent to the associated mobile terminal as a request signal power via the output terminal 9k (k=A, B, C) and power control command transmitting section.

As stated above, the fifth embodiment also sets evaluation amounts weighted in accordance with the priority order of information media while taking account of the interference signals and other noise input from the adjoining cells, and controls the request signal powers such that the evaluation amounts become as small as possible. Therefore, even when the number of calls increases, the quality of information media of higher degree of priority is maintained. In addition, the media-by-media mean SIRs and mean numbers of channels are output by rapid calculation, and step control is executed in accordance with the signs of correction vectors. This promotes stable, yet simple, control.

Sixth Embodiment

Figure 10B:
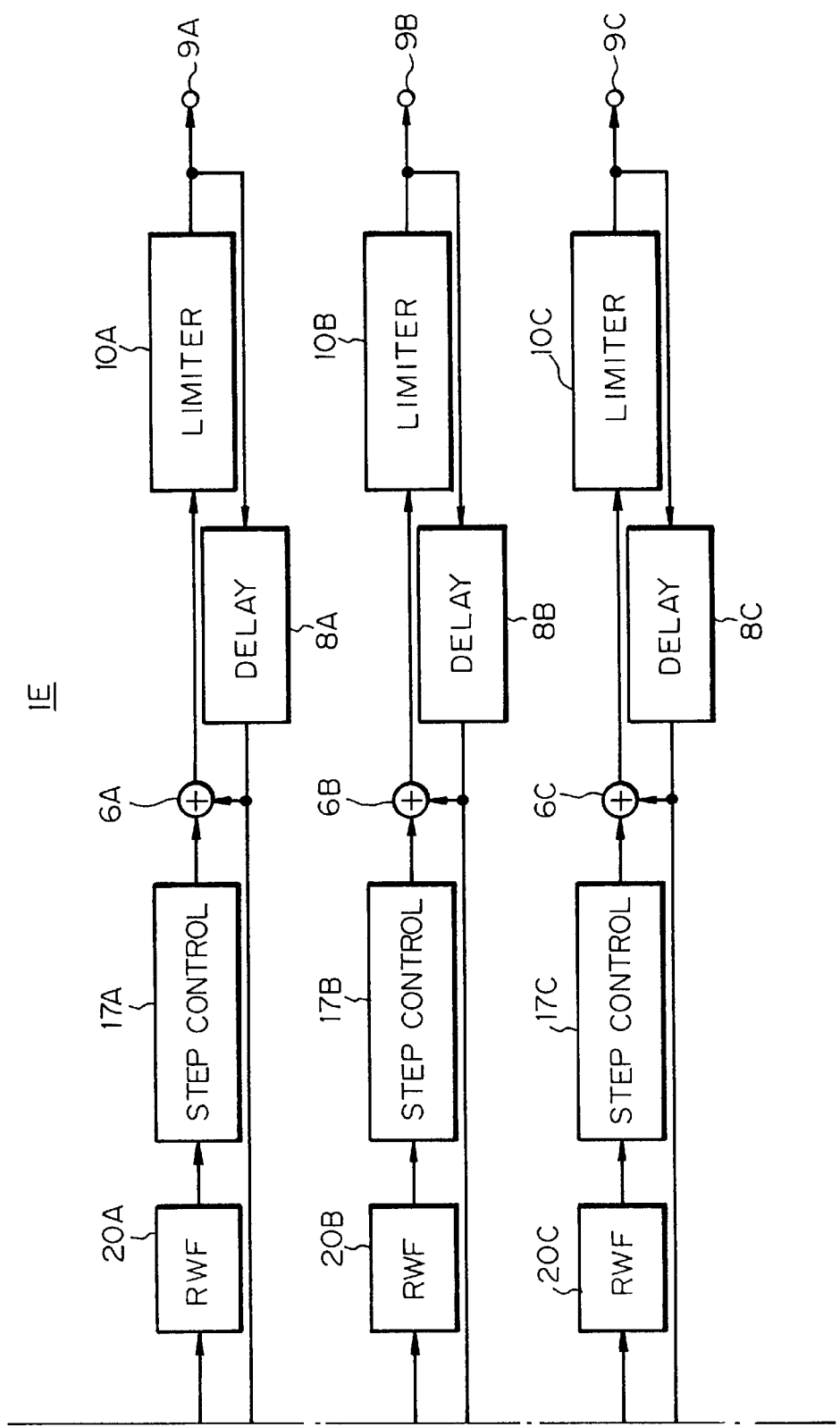

Reference will be made to FIGS. 10A and 10B for describing a sixth embodiment of the present invention. This embodiment is also based on the mobile communication system shown in FIG. 1 and including three different information media 11A–11C each needing a particular quality. In FIGS. 10A and 10B, like structural elements as the elements shown in FIG. 9 are designated by the same reference numerals, and a detailed description thereof will not be made in order to avoid redundancy.

As shown in FIGS. 10A and 10B, a transmission power control apparatus, generally 1E, includes the total power monitor 3, a correction vector calculation 4e, the sign identifications 18A–18C, the step controls 17A–17C, the adders 6A–6C, the limiters 10A–10C, the delays 8A–8C, and random walk filters (RWF hereinafter) 20A–20C. The control apparatus 1E differs from the control apparatus 1D, FIGS. 9A and 9B, in that the mean SIR calculations 441–443 are absent in the correction vector calculating circuit 4e, in that the mean channel number calculation circuit 19 is absent, and in that the RWFs 20A–20C are added. The following description will concentrate on such differences.

The RWFs 20A–20C provide the control apparatus 1E with robustness by absorbing momentary changes, i.e., by avoiding abrupt control. Specifically, the RWFs 20A–20C each has two threshold values of ±K (K being a positive integer) and uses zero intermediate between the two threshold values as its initial value. The RWF 20k (k=A, B, C) adds +1 if the output of the associated sign identification 18k is positive, or adds −1 if it is negative. When the RWF 20k reaches either one of the two threshold values, it delivers a positive signal or a negative signal to the step control 17k. On delivering the positive signal or the negative signal to the step control 17k, the RWF 20k resets its cumulative value to zero.

With the RWFs 20A–20C, therefore, it is possible to cause the request signal power control to reflect the tendency of the outputs of the sign identifications 18k as to which of the positive signs and negative signs are predominant. This successfully obviates abrupt control and thereby implements robustness by absorbing momentary changes. It follows that the control apparatus 1E is practicable without resorting to the mean value calculation of the fifth embodiment, i.e., the mean SIR calculations 441–443 or the mean channel number calculating circuit 19. In addition, the entire control apparatus 1D can operate at the control intervals and eliminates the need for rapid calculation.

In operation, the total power monitor 3 measures the total interference power I of the received signal (t) coming in through the receipt antenna 2, and feeds it to the correction vector calculating circuit 4e. In the calculating circuit 4e, the SIR calculations 411–413 each determines a ratio SIR of the associated request signal power S requested one control interval before to the total interference power I. The SIRs output from the SIR calculations 411–413 are fed to the slope vector calculation 42c. At this instant, the media-by-media numbers of terminals connected are fed from the channel control unit output terminals 16A–16C to the slope vector calculation 42c.

The slope vector calculation 42c determines correction vectors by the steepest descent method on the basis of the media-by-media SIRs, numbers of terminals connected, request signal powers S, and total interference power I. At this instant, the calculation 42c produces correction vectors by use of the Eq. (10) as in the fifth embodiment. However, the difference is that not the mean values of the fifth embodiment but the momentary values are input to the SIRs $SIR_k$ and the numbers of channels $M_k$ of the Eq. (10).

The slope vectors are fed from the slope vector calculation 42c to the sign inversion 43. The sign inversion 43 inverts the signs of the slope vectors to thereby produce correction vectors and feeds the correction vectors to the sign identifications 18A–18C. The sign identifications 18k each determines whether or not the sign of the slope vector input thereto is positive or negative. Each RWF 20k assigned to the information medium k receives the output of the associated sign identifications 18k. Only when the cumulative value of the positive signs or that of the negative signs exceeds the associated threshold value (±k), the RWF 20k feeds a positive signal or a negative signal representative of the previously mentioned tendency to the associated step control 17k.

The step control 17k determines a preselected power increment/decrement Δ in accordance with the sign output from the RWF 20k. Upon receiving the output of the RWF 20k, the adder 6k adds the request signal power $p_i(n)$ requested one control interval before and the output of the step control circuit 17k. The resulting sum $p_i^{(n+1)} = p_i^{(n)} + \Delta$ is the candidate of the next request signal power $p_i^{(n+1)}$ to be requested.

The limiter 10k confines the output of the associated adder 6k, i.e., the request signal power in the preselected dynamic range. The output of the limiter 10k is sent to the associated mobile terminal as a request signal power via the output terminal 9k and power control command transmitting section.

As stated above, the sixth embodiment also sets evaluation amounts weighted in accordance with the priority order of information media while taking account of the interference signals and other noise input from the adjoining cells, and controls the request signal powers such that the evaluation amounts become as small as possible. Therefore, even when the number of calls increases, the quality of information media of higher degree of priority is maintained. In addition, because calculation higher in speed than the control intervals is not necessary, not only is the control simplified, but robustness is also realized.

In summary, in accordance with the present invention, a transmission power control apparatus for a CDMA system produces a difference in power ratio medium by medium and weights the difference in accordance with the priority order given to information media to thereby output an evaluation value. As a result, the evaluation value reflects the difference of an information medium of higher degree of priority more than the difference of an information medium of lower degree of priority. It follows that a difference between the actual quality and the required quality is reduced more with the medium of higher degree of priority than with the medium of lower degree of priority. In addition, the control itself is simplified because step control is executed in accordance with the sign of a correction amount.

The entire disclosure of Japanese patent application Nos. 38771/1997, 49231/1997 and 271163/1997 respectively filed on Feb. 24, 1997, Mar. 4, 1997 and Oct. 3, 1997 including the specifications, claims, accompanying drawings and abstracts of the disclosure is incorporated herein by reference in its entirety.

While the present invention has been described with reference to the illustrative embodiments, it is not to be restricted by the embodiments. It is to be appreciated that those skilled in the art can change or modify the embodiments without departing from the scope and spirit of the present invention.

What is claimed is:

1. A transmission power control apparatus for determining, with signals received from a plurality of terminals, a difference between a ratio of a signal power of each of the received signals to a total power of the received signals and a requested value for an associated one of the plurality of terminals, and controlling transmission powers to be requested of the plurality of terminals on the basis of said differences determined for the plurality of terminals, said transmission power control apparatus comprising:

a request signal power updating circuit operable to square the differences determined signal by signal and sum the squared differences with weights in accordance with communication quality required for the received signals to thereby produce an evaluation value representative of a sum of the squared and weighted differences, and update a transmission power to be requested of each of the terminals such that said evaluation value decreases.

2. A transmission power control apparatus for controlling a transmission power of each of a plurality of terminals on the basis of a power of a signal received from the individual terminal, said transmission power control apparatus comprising:

a power ratio calculating circuit operable to determine, with each of a plurality of information media available for the plurality of terminals, a sum of powers received from the terminals, and determine a ratio of the sum of powers to a total power received from all of the plurality of terminals;

a difference calculating circuit operable to calculate a difference between said ratio determined medium by medium and a request value requested a single control interval before terminal by terminal;

a request signal power updating circuit operable to weight said difference in accordance with a degree of importance of the information medium to thereby produce an evaluation amount of said difference for each information medium, and update a request signal power to be requested of the individual information medium such that said evaluation value decreases.

3. An apparatus in accordance with claim 2 wherein said power ratio calculating circuit is operable to determine said total power on the basis of numbers of terminals receiving the plurality of information media and a request signal power requested of the individual information medium a single control interval before.

4. An apparatus in accordance with claim 2, wherein said power ratio calculating circuit is operable to determine said total power by measurement.

5. An apparatus in accordance with claim 2, wherein said request signal power updating circuit comprises:

a correction vector calculating section operable to invert signs of slope vectors of evaluation functions each being produced by weighting said difference produced medium by medium to thereby output correction vectors opposite in vector direction to said slope vectors; and an updating amount calculating section operable to multiply said correction vectors by a preselected constant to thereby update request signal powers to be requested medium by medium.

6. An apparatus in accordance with claim 2, wherein the power to be requested of one of the plurality of information media is fixed while the powers to be requested of other information media are updated.

7. An apparatus in accordance with claim 5, wherein said correction vector calculating section and said updating amount calculating section are operable to perform calculation only with other information media.

8. A transmission power control apparatus for controlling a transmission power of each of a plurality of terminals on the basis of a power of a signal received from an individual terminal, said transmission power control apparatus comprising:

a power ratio calculating circuit operable to determine, with each of a plurality of information media, a sum of powers of signals received from the terminals, and determine a ratio of said sum of powers to a total power received from all of said plurality of terminals;

a correction amount calculating circuit operable to produce a difference between said ratio determined medium by medium and a request signal power ratio produced from a request signal power calculated a single control interval before medium by medium, weight a square value of each of said differences produced medium by medium with a degree of importance of a corresponding one of the information media, calculate a sum value of the square values with respect to the plurality of information media, evaluate said difference with the sum value to produce a resultant evaluation value, and calculate a slope vector of the evaluation value for a correction amount medium by medium such that the evaluation value decreases;

a sign identifying circuit operable to determine whether or not correction amounts output from said correction amount calculating circuit each is positive or negative;

a step control circuit operable to output, for each of results of identification output from said sign identifying circuit, a preselected increment/decrement in accordance with the result;

a request signal power calculating circuit operable to add said preselected increment/decrement to said request signal power calculated a single control interval before medium by medium to thereby output a request signal power to be requested at a current control interval; and a control command transmitting circuit operable to transmit, based on said request signal power output from said request signal power calculating circuit, a control signal to a corresponding one of the plurality of terminals.

9. An apparatus in accordance with claim 8, wherein said ratio with which said correction amount calculating circuit produces said difference is produced by averaging power ratios calculated by said power ratio calculating circuit medium by medium.

10. An apparatus in accordance with claim 8, further comprising a filter connected between said sign identifying circuit and said step control circuit operable to add up the results of identification output from said sign identifying circuit medium by medium, and feed a positive or a negative result of identification to said step control circuit only when a resulting sum exceeds either one of a positive or a negative threshold value selected beforehand.

11. A transmission power control apparatus for determining, with each of signals received from a plurality of terminals, a difference between a ratio of a signal power to a total power and a requested value, and controlling a transmission power to be requested of an associated one of the plurality of terminals on the basis of said difference, said transmission power control apparatus comprising:

a request signal power updating circuit operable to weight the difference determined signal by signal in accordance with signal-by-signal required communication quality to thereby calculate an evaluation value representative of an evaluation of the difference, and update a transmission power to be requested of the terminal associated with said difference such that said evaluation value decreases;

wherein said difference is weighted by an amount which increases with an increase in a degree of a required communication quality.

12. A transmission power control apparatus for determining, with each of signals received from a plurality of terminals, a difference between a ratio of a signal power to a total power and a requested value, and controlling a transmission power to be requested of an associated one of the plurality of terminals on the basis of said difference, said transmission power control apparatus comprising:

a request signal power updating circuit operable to weight the difference determined signal by signal in accordance with signal-by-signal required communication quality to thereby calculate an evaluation value representative of an evaluation of the difference, and update a transmission power to be requested of the terminal associated with said difference such that said evaluation value decreases;

wherein said difference is weighted by an amount which varies in accordance with a kind of information medium interchanged between said apparatus and the terminal.

* * * * *